United States Patent [19]

McIntosh

[11] Patent Number: 4,579,202
[45] Date of Patent: Apr. 1, 1986

[54] BRAKE HOLDING APPARATUS

[75] Inventor: Arthur M. McIntosh, Arlington Heights, Ill.

[73] Assignee: Borg-Warner Corporation, Chicago, Ill.

[21] Appl. No.: 588,185

[22] Filed: Mar. 12, 1984

[51] Int. Cl.⁴ .................................................. B60K 41/24
[52] U.S. Cl. .................................... 192/0.09; 70/255; 180/287; 188/353; 192/0.049; 192/0.094; 192/3 H
[58] Field of Search ................. 192/0.049, 0.09, 0.094, 192/3 H, 3 TR; 70/255; 180/272, 287; 188/353

[56] References Cited

U.S. PATENT DOCUMENTS

| | | | |
|---|---|---|---|
| 2,181,699 | 11/1939 | Leichsenring, Jr. | 192/13 |
| 2,197,721 | 4/1940 | Goepfrich | 192/0.01 |
| 2,201,125 | 5/1940 | Freeman | 102/0.01 |
| 2,245,958 | 6/1941 | Barr et al. | 192/3 H |
| 2,277,584 | 3/1942 | Freeman | 192/0.01 |
| 2,522,835 | 9/1950 | Mayrath | 192/3 |
| 2,690,824 | 10/1954 | Forman | 192/3 |
| 2,938,611 | 5/1960 | Cooke | 192/3 |
| 3,433,336 | 3/1969 | Mizuno | 192/3 TR |
| 3,698,505 | 10/1972 | Webley | 180/287 |
| 4,515,259 | 5/1985 | Ha | 192/0.049 |

FOREIGN PATENT DOCUMENTS 2845011  4/1979  Fed. Rep. of Germany ...... 188/353

Primary Examiner—Allan D. Herrmann
Attorney, Agent, or Firm—Julian Schachner

[57] ABSTRACT

Brake holding apparatus for use in a vehicle having a fluid pressure operated braking system including a master cylinder and at least one brake cylinder. The apparatus includes a trapping valve movable to an open position allowing fluid communication between the master and brake cylinders, and to a closed position blocking this fluid communication so as to trap fluid pressure in the brake cylinder. The trapping valve is biased for movement to its open position. Means are provided for moving the trapping valve to its closed position. A bypass valve allows fluid communication from the master cylinder to the brake cylinder, but blocks fluid communication in the opposite direction. The trapping valve is fluid pressure balanced such that fluid pressure trapped in the brake cylinder has no effect on the position of the valve.

14 Claims, 2 Drawing Figures

BRAKE HOLDING APPARATUS

BACKGROUND OF THE INVENTION

This invention relates generally to brake holding apparatus adapted for use in an automotive vehicle. More particularly, it relates to such apparatus for use between a master cylinder and the brake cylinders to provide anti-roll, anti-creep and anti-theft functions.

U.S. Pat. No. 2,522,835 issued to R. L. Mayrath on Sept. 19, 1950 discloses a brake holding device which uses a solenoid actuated valve and a check valve to trap brake fluid in the brake cylinders. However, the trapped fluid develops a force which opposes the force applied by the solenoid. Thus the braking pressure is limited by solenoid capacity. Further, the Mayrath device is vacuum controlled, and thus subject to variables in engine and load characteristics.

There remains a need in the art to improve upon brake holding devices of the Mayrath type in order to increase the available braking pressure, operate independently of manifold pressure, and at the same time reduce the force required to actuate the holding device, thus improving operating efficiency.

SUMMARY OF THE INVENTION

This invention is directed to brake holding apparatus which meets this need. The apparatus is adapted for use in a vehicle having a fluid pressure operated braking system including a master cylinder and at least one brake cylinder. It includes a trapping valve movable to an open position allowing fluid communication between the master and brake cylinders, and to a closed position blocking fluid communication therebetween so as to trap fluid pressure in the brake cylinder. Means are provided for biasing the trapping valve for movement to its open position, and for moving the trapping valve to its closed position. A bypass valve allows fluid communication from the master cylinder to the brake cylinder, but blocks fluid communication in the opposite direction. The apparatus is constructed and arranged such that fluid pressure trapped in the brake cylinder has no effect on the position of the trapping valve.

BRIEF DESCRIPTION OF THE DRAWING

The objects and advantages of this invention will become apparent to those skilled in the art upon careful consideration of the specification herein, including the drawing, wherein.

Figure 1:
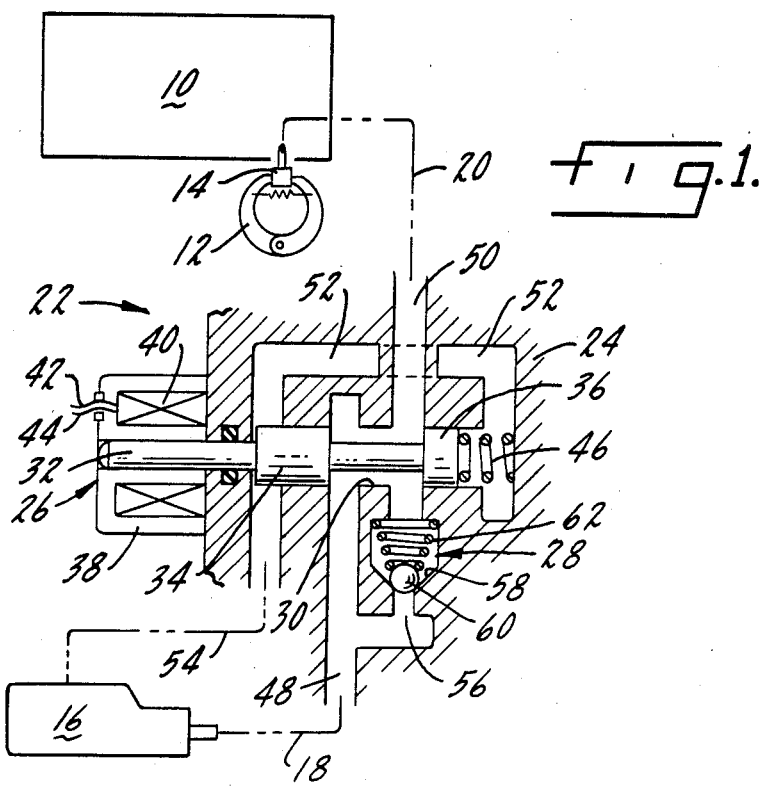
FIG. 1 is a sectional view of the brake holding apparatus of this invention.

While this invention is susceptible of embodiment in many different forms, the preferred embodiment is shown in the drawing and will be described in detail. It should be understood that the present disclosure is considered to be an exemplification of the principals of the invention, and is not intended to limit the invention to this embodiment.

DESCRIPTION OF THE PREFERRED EMBODIMENT

Referring to FIG. 1 of the drawing in greater detail, an automotive vehicle 10 is provided with a plurality of brakes 12, one of which is shown. Each brake 12 is applied by a brake cylinder 14. A master cylinder 16 is in fluid communication with brake cylinder 14 through first and second fluid pressure lines 18 and 20. In a conventional braking system, lines 18 and 20 would be integral. The brake holding apparatus 22 of this invention is interposed between lines 18 and 20.

Under normal operating conditions, when the vehicle operator depresses the brake pedal (not shown), fluid pressure is directed from master cylinder 16 through lines 18 and 20 to brake cylinder 14 so as to apply brake 12. When the operator releases the brake pedal, fluid pressure is relieved from brake cylinder 14 through lines 20 and 18 to master cylinder 16, thereby releasing brake 12.

Brake holding apparatus 22 inhibits release of brake 12 under certain conditions, even when the brake pedal is released. Apparatus 22 includes a housing 24, a solenoid actuated trapping valve 26 and a bypass check valve 28.

Housing 24 defines a bore 30. Trapping valve 26 includes a valve spool 32 having spaced lands 34 and 36. Valve 26 also includes a solenoid 38 which, when actuated, slides spool 32 to the right from the open position shown in FIG. 1. Solenoid 38 includes a coil 40 having leads 42 and 44. A biasing spring 46 is provided to slide spool 32 to the left when solenoid 38 is not actuated.

Housing 24 also defines first and second fluid passages 48 and 50 communicating with bore 30 between lands 34 and 36 of spool 32. Passages 48 and 50 are in fluid communication respectively with lines 18 and 20. Housing 24 defines a third fluid passage 52 communicating the outer ends of bore 30. Passages 52 is in fluid communication with the reservoir of master cylinder 16 through a fluid return line 54.

When coil 40 of solenoid 38 is not energized, spring 46 slides spool 32 leftwardly to the open position shown in FIG. 1. In this position fluid communication is established between passages 48 and 50 through bore 30. When coil 40 is energized, solenoid 38 slides spool 40 rightwardly against the biasing force of spring 46 to a closed position in which land 34 blocks fluid communication between passage 48 and bore 30, but does not block fluid communication between bore 30 and passage 50.

Housing 24 further defines a fourth fluid passage 56 communicating passage 48 with bore 30 and passage 50. A valve seat 58 is formed in passage 56. Bypass check valve 28 includes a ball 60 and a spring 62 providing a force urging ball 60 toward seat 58 so as to block passage 56. Bypass valve 28 is oriented such that fluid may flow from passage 48 to bore 30 and passage 50 through passage 56, but may not flow in the opposite direction through passage 56.

It is important to note that passages 48 and 50 communicate with bore 30 between lands 34 and 36 of spool 32. Fluid pressure in bore 30 always acts with equal forces on lands 34 and 36, tending to move them equally in opposite directions. This results in a net fluid force of zero on spool 32. Similarly, passage 52 communicates the outer ends of bore 30 with return line 54. Any fluid in passage 52 would only develop negligible forces tending to unbalance spool 32. The result here too is essentially a net fluid force of zero on spool 32. Thus it is apparent that spool 32 is fluid pressure balanced, and is not influenced by any fluid forces. The capacity of solenoid 38 may be made low, as the only significant force it must overcome in order to slide spool 32 is the biasing force of spring 46. Thus the braking pressure applied to brake cylinder 14 has no effect on valve 26.

The trapped pressure may be high, while at the same time the capacity of solenoid 38 may be low.

Figure 2:
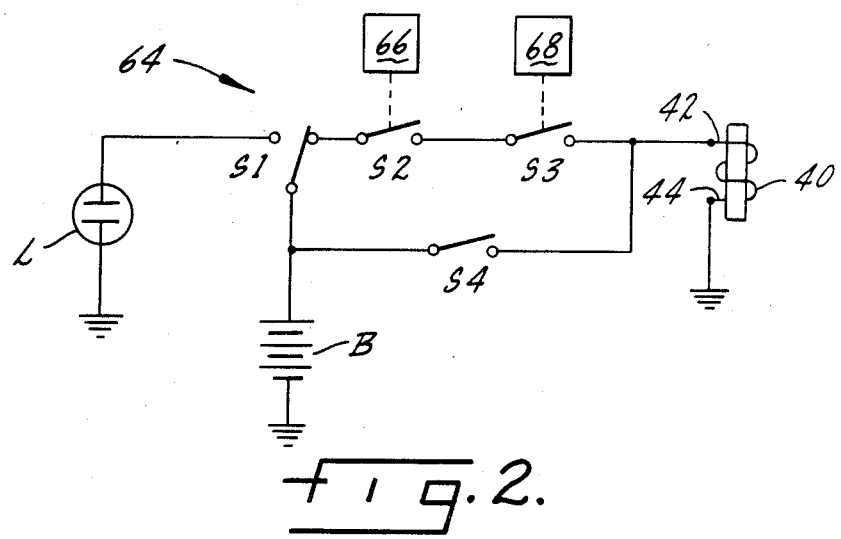
FIG. 2 is a schematic diagram of the control circuit for the apparatus shown in FIG. 1.

Referring now to FIG. 2 of the drawing, there is shown a control circuit 64 for apparatus 22. A power source, for example the hot side of a battery B in vehicle 10, is connected to an enabling switch S1, preferably of the single-pole, double-throw type. As shown in FIG. 2, switch S1 is in its enabling position, in series with first and second actuating switches S2 and S3 connected to lead 42 of coil 40. Lead 44 of coil 40 is connected to the ground side of battery B to complete an energizing circuit for coil 40, which constitutes an actuating circuit for solenoid 38. Switches S2 and S3 preferably are of the single-pole, single-throw type.

Switch S1 may be switched to its disabling position, opening the actuating circuit for solenoid 38. In this position switch S1 connects battery B to an indicator light L. Thus light L indicates when the actuating circuit for solenoid 38 is open or disabled.

An anti-theft switch S4, preferably of the single-pole, single-throw type, is connected in parallel with switches S1, S2 and S3; that is, in series with battery B and coil 40. When switch S4 is closed, another energizing circuit for coil 40 is completed independently of switches S1, S2 and S3. This constitutes another actuating circuit for solenoid 38.

With valve spool 32 in the open position shown in FIG. 1, brake holding apparatus 22 has no effect on the braking system of vehicle 10. When the operator depresses the brake pedal, fluid pressure is directed from master cylinder 16 through line 18, passage 48, bore 30, passage 50 and line 20 to brake cylinder 14. Brake 12 is applied in the conventional manner. When the operator releases the brake pedal, fluid pressure is relieved from brake cylinder 14 through line 20, passage 50, bore 30, passage 48 and line 18 to brake cylinder 16, again in the conventional manner.

It is anticipated that apparatus 22 may be used in a vehicle having either a manual or an automatic transmission. With a manual transmission switch S2 would be closed when the operator disengages the clutch (box 66) by depressing the clutch pedal. Switch S3 would be closed when the operator shifts the transmission into low gear (box 68). With an automatic transmission S2 would be controlled by the throttle switch (box 66), and S3 by the vehicle speed switch (box 68).

When stopping a vehicle with a manual transmission, apparatus 22 performs an anti-roll function. The operator disengages the clutch as the vehicle comes to a stop. This closes switch S2. The operator then shifts the transmission into low gear, closing switch S3. Coil 40 is energized, actuating solenoid 38 and causing it to slide valve spool 32 to its closed position, blocking passage 48. This traps brake fluid in brake cylinder 14. If the brakes are applied, they remain so. If they are not applied, the operator may apply them by depressing the brake pedal momentarily to direct fluid pressure from master cylinder 16 through bypass valve 28 to brake cylinder 14.

When starting to move a vehicle with a manual transmission, the operator engages the clutch by releasing the clutch pedal, opening switch S2. Solenoid 38 is no longer actuated. Spring 46 returns valve spool 32 to its open position, unblocking passage 48. Fluid pressure in brake cylinder 14 is relieved, and brake 12 is released. The operator may depress the throttle before releasing the clutch, if necessary, to start the vehicle with no initial rollback on a steep slope.

When use in a vehicle with an automatic transmission, apparatus 22 also performs an anti-creep function. The throttle switch closes at engine idle, and the vehicle speed switch closes at a near zero vehicle speed. The operation is the same as noted above with regard to a manual transmission.

The brake holding apparatus disclosed herein allows a high braking pressure to be applied to brake 12, as the trapped pressure has no effect on valve 26. Braking pressure is limited only by the force available at the brake pedal. The solenoid may be relatively small, as it is required to overcome only the force of the biasing spring (and negligible valve drag).

Enabling switch S1 is an optional feature, allowing the operator to disable apparatus 22 manually when not needed. This might be beneficial when road conditions are slippery, or when low gear is used extensively on rough or hilly terrain. If switch S1 is not provided, switch S2 would be connected directly to battery B.

Similarly, anti-theft switch S4 is an optional feature. When switch S4 is closed, a thief would have difficulty moving the vehicle after once having applied the brakes. Switch S4 could be manual, or could be under the control of the vehicle ignition switch and closed with removal of the ignition key.

Finally, the apparatus disclosed herein does not require any vacuum, and is not influenced by engine speed. It makes no demands on the intake system of a modern engine with pollution control devices.

CLAIMS

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. Brake holding apparatus for use in a vehicle having a fluid pressure operated braking system including a master cylinder and at least one brake cylinder, said apparatus comprising a trapping valve movable to an open position allowing fluid communication between said master and brake cylinders, and to a closed position blocking fluid communication therebetween so as to trap fluid pressure in said brake cylinder, means biasing said trapping valve for movement to said open position, means for moving said trapping valve to said closed position, and a bypass valve allowing fluid communication from said master cylinder to said brake cylinder but blocking fluid communication in the opposite direction, said moving means including a solenoid, and a control circuit having an actuating circuit for said solenoid, said actuating circuit including, in series, a power source, first and second actuating switches, and the coil of said solenoid, said control circuit also having another actuating circuit for said solenoid, said other actuating circuit including, in series, said power source, an anti-theft switch, and the coil of said solenoid.

2. The brake holding apparatus of claim 1, said control circuit also having an enabling switch for said actuating circuit, said enabling switch being in series with said power source, said first and second actuating switches, and the coil of said solenoid.

3. The brake holding apparatus of claim 1, said control circuit being constructed and arranged such that said anti-theft switch closes when the vehicle ignition is turned off.

4. Brake holding apparatus for use in a vehicle having a fluid pressure operated braking system including a master cylinder, at least one brake cylinder, and first and second fluid pressure lines respectively communicating with said master and brake cylinders, said apparatus comprising a housing defining a bore, a trapping valve including a valve spool having spaced lands slidably received in said bore, said housing also defining first and second fluid passages respectively communicating said first and second lines with said bore between said lands, a third passage communicating the ends of said bore, a return line communiating said third passage with the reservoir of said master cylinder, and a fourth passage communicating said first passage with said bore between said lands, means biasing said spool toward an open position allowing fluid communication between said first and second passages through said bore, means for sliding said spool to a closed position blocking fluid communication between said first passage and said bore but not between said bore and said second passage, and a bypass check valve in said fourth passage allowing fluid communication from said first passage to said bore and said second passage but not in the opposite direction.

5. The brake holding apparatus of claim 4, said sliding means including a solenoid, and a control circuit having an actuating circuit for said solenoid, said actuating circuit including, in series, a power source, first and second actuating switches, and the coil of said solenoid.

6. The brake holding apparatus of claim 5, said control circuit also having an enabling switch for said actuating circuit, said enabling switch being in series with said power source, said first and second actuating switches, and the coil of said solenoid.

7. The brake holding apparatus of claim 5, said control circuit also having another actuating circuit for said solenoid, said other actuating circuit including, in series, said power source, an anti-theft switch, and the coil of said solenoid.

8. The brake holding apparatus of claim 5, said control circuit being constructed and arranged such that said anti-theft switch closes when the vehicle ignition is turned off.

9. The brake holding apparatus of claim 6, said control circuit also having another actuating circuit for said solenoid, said other actuating circuit including, in series, said power source, an anti-theft switch, and the coil of said solenoid.

10. The brake holding apparatus of claim 9, said control circuit being constructed and arranged such that said anti-theft switch closes when the vehicle ignition is turned off.

11. The brake holding apparatus of claim 5 for use in a vehicle having a manual transmission, said control circuit being constructed and arranged such that said first actuating switch closes when the vehicle clutch is disengaged, and said second actuating switch closes when said transmission is shifted into low gear.

12. The brake holding apparatus of claim 5 for use in a vehicle having an automatic transmission, said control circuit being constructed and arranged such that said first actuating switch closes when the vehicle engine is running at idle, and said second actuating switch closes when the vehicle speed is near zero.

13. Brake holding apparatus for use in a vehicle having a manual transmission and a fluid pressure operated braking system including a master cylinder and at least one brake cylinder, said apparatus comprising a trapping valve movable to an open position allowing fluid communication between said master and brake cylinders, and to a closed position blocking fluid communication there-between so as to trap fluid pressure in said brake cylinder, means biasing said trapping valve for movement to said open position, means for moving said trapping valve to said closed position, said moving means including a solenoid, a bypass valve allowing fluid communication from said master cylinder to said brake cylinder but blocking fluid communication in the opposite direction, and a control circuit having an actuating circuit for said solenoid, said actuating circuit including, in series, a power source, first and second actuating switches, and the coil of said solenoid, said control circuit being constructed and arranged such that said first actuating switch closes when the vehicle clutch is disengaged, and said second actuating switch closes when said transmission is shifted into low gear.

14. Brake holding apparatus for use in a vehicle having an automatic transmission and a fluid pressure operated braking system including a master cylinder and at least one brake cylinder, said apparatus comprising a trapping valve movable to an open position allowing fluid communication between said master and brake cylinders, and to a closed position blocking fluid communication there-between so as to trap fluid pressure in said brake cylinder, means biasing said trapping valve for movement to said open position, means for moving said trapping valve to said closed position, said moving means including a solenoid, a by pass valve allowing fluid communication from said master cylinder to said brake cylinder but blocking fluid communication in the opposite direction, and a control circuit having an actuating circuit for said solenoid, said atcuating circuit including, in series, a power source, first and second actuating switches, and the coil of said solenoid, said control circuit being constructed and arranged such that said first actuating switch closes when the vehicle engine is running at idle, and said second actuating switch closes when the vehicle speed is near zero.

* * * * *

UNITED STATES PATENT OFFICE
CERTIFICATE OF CORRECTION

PATENT NO. : 4,579,202
DATED : April 1, 1986
INVENTOR(S) : ARTHUR M. McINTOSH

It is certified that error appears in the above-identified patent and that said Letters Patent are hereby corrected as shown below:

Column 5, line 40, cancel "claim 5" and insert -- claim 7 --.

Column 6, line 40, cancel "there-between" and insert -- therebetween --.

Signed and Sealed this

Fifteenth Day of July 1986

[SEAL]

Attest:

DONALD J. QUIGG

Attesting Officer

Commissioner of Patents and Trademarks